United States Patent
Yamazaki et al.

(10) Patent No.: US 11,560,033 B2
(45) Date of Patent: Jan. 24, 2023

(54) VEHICLE WITH ROAD SURFACE CONDITION DETECTOR

(71) Applicant: HONDA MOTOR CO., LTD., Tokyo (JP)

(72) Inventors: Ryosuke Yamazaki, Wako (JP); Takashi Yanagi, Wako (JP); Kazuya Konada, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/681,715

(22) Filed: Feb. 26, 2022

(65) Prior Publication Data

US 2022/0297497 A1 Sep. 22, 2022

(30) Foreign Application Priority Data

Mar. 22, 2021 (JP) ............... JP2021-046948

(51) Int. Cl.
*B60G 17/0165* (2006.01)
*B62D 35/02* (2006.01)
(Continued)

(52) U.S. Cl.
CPC ....... *B60G 17/0165* (2013.01); *B60G 17/019* (2013.01); *B60G 17/0161* (2013.01);
(Continued)

(58) Field of Classification Search
CPC ............ B60G 17/0165; B60G 17/0161; B60G 17/0162; B60G 17/019; B60G 17/08; B60G 2400/82; B60G 2401/21; B62D 35/02
See application file for complete search history.

(56) References Cited

U.S. PATENT DOCUMENTS

| | | | |
|---|---|---|---|
| 5,390,118 A * | 2/1995 | Margolis | B62D 1/28 701/23 |
| 5,450,322 A * | 9/1995 | Tanaka | G01S 15/88 280/5.518 |
| 11,285,773 B1 * | 3/2022 | Hall | B60G 17/0161 |

(Continued)

FOREIGN PATENT DOCUMENTS

| JP | S61-135811 A | 6/1986 |
|---|---|---|
| JP | 2013-533159 A | 8/2013 |

(Continued)

OTHER PUBLICATIONS

Office Action received in corresponding Japanese application No. 2021-046948 dated Aug. 2, 2022 with English translation (6 pages).

*Primary Examiner* — Toan C To
(74) *Attorney, Agent, or Firm* — Rankin, Hill & Clark LLP

(57) ABSTRACT

A vehicle with a road surface condition detector includes: a vehicle body configured to have one or more passengers; front and rear wheels configured to move the vehicle body; and a road surface condition detector configured to detect road surface conditions in front of the front and rear wheels, wherein the road surface condition detector includes front-wheel road surface condition detectors configured to detect road surface conditions in front of the front wheels and rear-wheel road surface condition detectors configured to detect road surface conditions in front of the rear wheels, and the rear-wheel road surface condition detectors detect areas located outer in a vehicle width direction than ends of detection areas detected by the front-wheel road surface condition detectors.

8 Claims, 6 Drawing Sheets

(51) Int. Cl.
    *B60G 17/016*     (2006.01)
    *B60G 17/019*     (2006.01)
    *B60G 17/08*     (2006.01)

(52) U.S. Cl.
    CPC ......... *B60G 17/0162* (2013.01); *B62D 35/02* (2013.01); *B60G 17/08* (2013.01); *B60G 2400/82* (2013.01); *B60G 2401/21* (2013.01)

(56) References Cited

U.S. PATENT DOCUMENTS

| | | | | |
|---|---|---|---|---|
| 2010/0138108 A1* | 6/2010 | Kajino | ................ | B60G 17/016 701/38 |
| 2012/0053789 A1* | 3/2012 | Noumura | ............ | B60W 40/068 701/37 |
| 2013/0103274 A1 | 4/2013 | Binder et al. | | |
| 2014/0195114 A1* | 7/2014 | Tseng | ................ | B60G 17/0165 701/1 |
| 2014/0232082 A1* | 8/2014 | Oshita | ................ | B60G 17/0162 280/124.161 |
| 2015/0352920 A1* | 12/2015 | Lakehal-Ayat | ...... | B60G 17/018 701/38 |
| 2015/0367702 A1* | 12/2015 | Kubota | ............. | B60G 17/0165 701/37 |
| 2021/0394573 A1* | 12/2021 | Vente | ................... | B60G 17/019 |
| 2022/0097473 A1* | 3/2022 | Kasuya | .............. | B60G 17/0182 |
| 2022/0111695 A1* | 4/2022 | Furuta | ................ | B60G 17/0165 |
| 2022/0134833 A1* | 5/2022 | Furuta | ................ | B60G 17/018 701/37 |
| 2022/0290984 A1* | 9/2022 | Yamazaki | ............ | G01B 11/303 |
| 2022/0290987 A1* | 9/2022 | Konada | ................... | G01S 13/08 |

FOREIGN PATENT DOCUMENTS

| | | | | |
|---|---|---|---|---|
| JP | 2013-205196 A | | 10/2013 | |
| JP | 2017171156 A | * | 9/2017 | ......... B60G 17/0165 |
| JP | 2022146136 A | * | 10/2022 | ......... B60G 17/0161 |

* cited by examiner

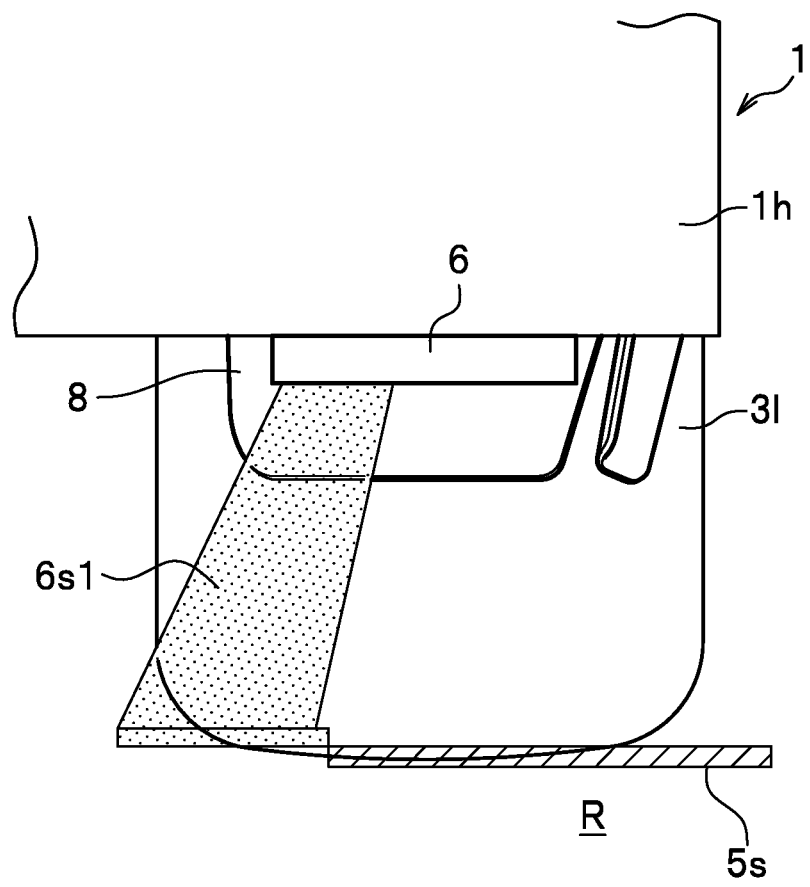

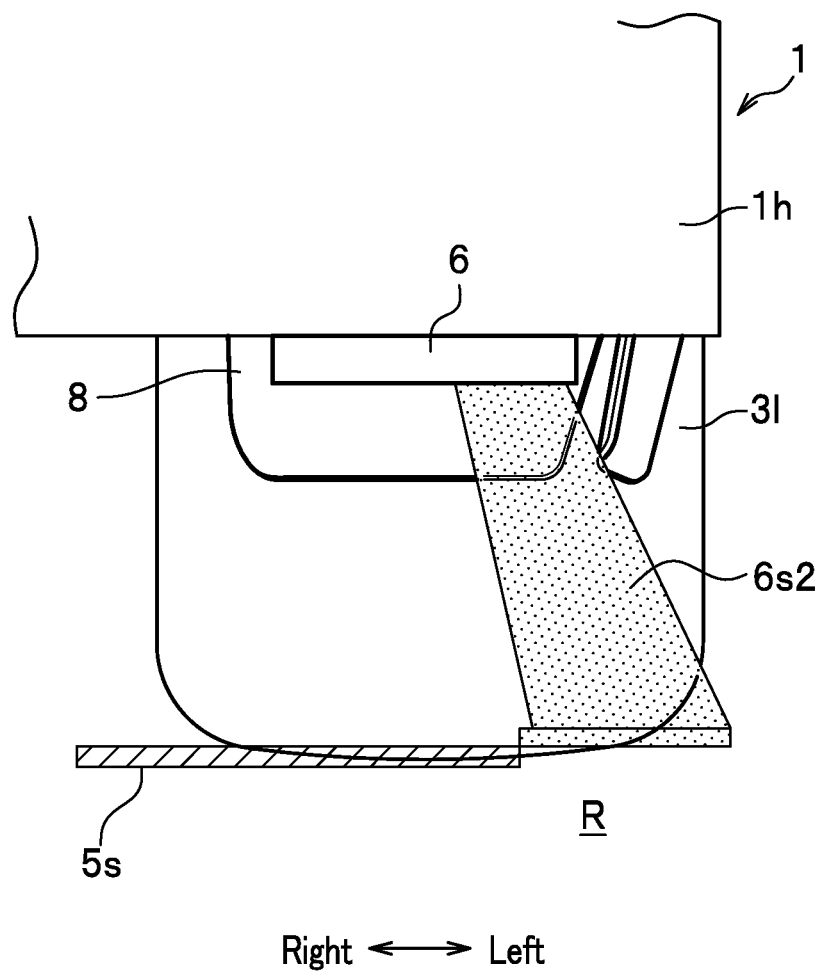

VEHICLE WITH ROAD SURFACE CONDITION DETECTOR

CROSS-REFERENCE TO RELATED APPLICATION

This application claims the benefit of priority to Japanese Patent Application No. 2021-046948 filed on Mar. 22, 2021, the disclosures of all of which are hereby incorporated by reference in their entireties.

TECHNICAL FIELD

The present invention relates to a vehicle with a road surface condition detector.

BACKGROUND OF THE INVENTION

A conventional vehicle detects road surface conditions to secure comfortable riding of passengers. Japanese Patent Application Publication No. 2013-205196 A (hereinafter, referred to Patent Document 1) discloses a vehicle 10 provided with a projector 12 at front thereof, in vicinity to a headlight, and a camera 18 at a front bumper. The projector 12 and the camera 18 are used to estimate road surface conditions in front of the vehicle 10.

SUMMARY OF THE INVENTION

Problems to be Solved

However, the vehicle according to Patent Document 1 is not provided with any sensors exclusively for rear wheels. As is the case with the invention of Patent Document 1, one or more preview sensors of a vehicle, used for detecting road surface conditions, are conventionally mounted in a front bumper and/or at a top of a front window of the vehicle. The vehicle according to Patent Document 1 is not provided with any sensors exclusively for rear wheels, and uses information detected at spots in front of the vehicle 10, to have a risk of inaccurately estimating road surface conditions at spots to be followed by the rear wheels, while the vehicle 10 is cornering to have a difference between tracks followed by front and rear wheels.

The present invention has been invented in view of above-described situations, and is intended to provide a vehicle capable of accurately detecting conditions on a road surface to be followed by wheels.

Solution to Problem

In order to solve the above-identified problem, a vehicle with a road surface condition detector according to a first aspect of the invention includes: a vehicle body configured to have one or more passengers; front and rear wheels configured to move the vehicle body; and a road surface condition detector configured to detect road surface conditions in front of the front and rear wheels, wherein the road surface condition detector includes front-wheel road surface condition detectors configured to detect road surface conditions in front of the front wheels and rear-wheel road surface condition detectors configured to detect road surface conditions in front of the rear wheels, and the rear-wheel road surface condition detectors detect areas located outer in a vehicle width direction than ends of detection areas detected by the front-wheel road surface condition detectors.

Advantageous Effects of the Invention

The present invention provides a vehicle capable of accurately detecting conditions on a road surface to be followed by the wheels.

BRIEF DESCRIPTION OF DRAWINGS

FIG. 4A is a partial enlarged view of the vehicle, as viewed from an arrowed direction II in FIG. 1A; and FIG. 4B is a partial enlarged view of the vehicle, as viewed from an arrowed direction II in FIG. 1A.

EMBODIMENTS OF THE INVENTION

Figure 1A:
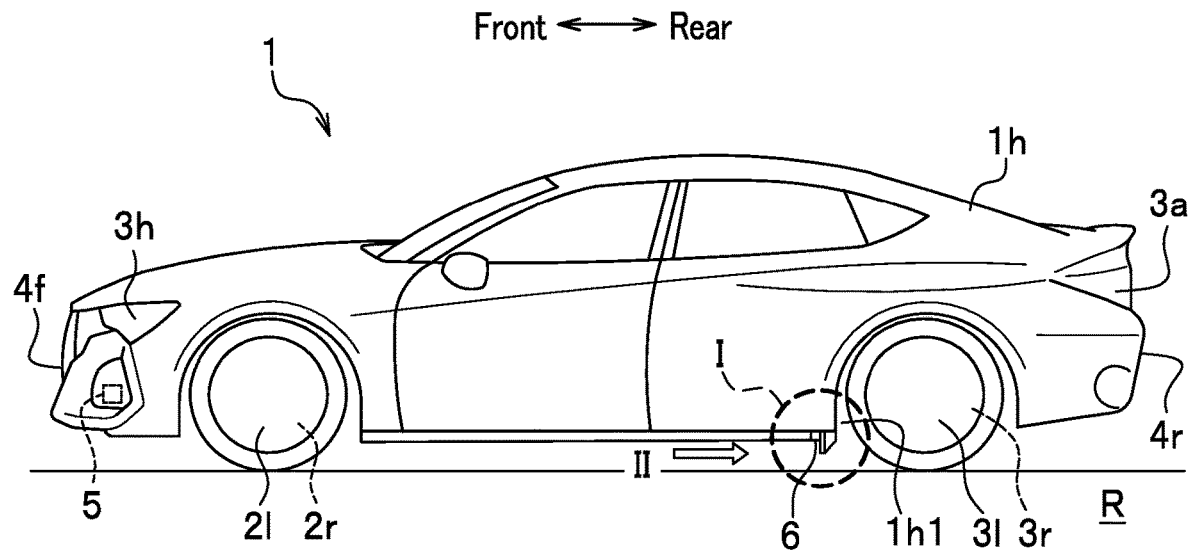
FIG. 1A is a side view of a vehicle according to an embodiment of the present invention.
Figure 1B:
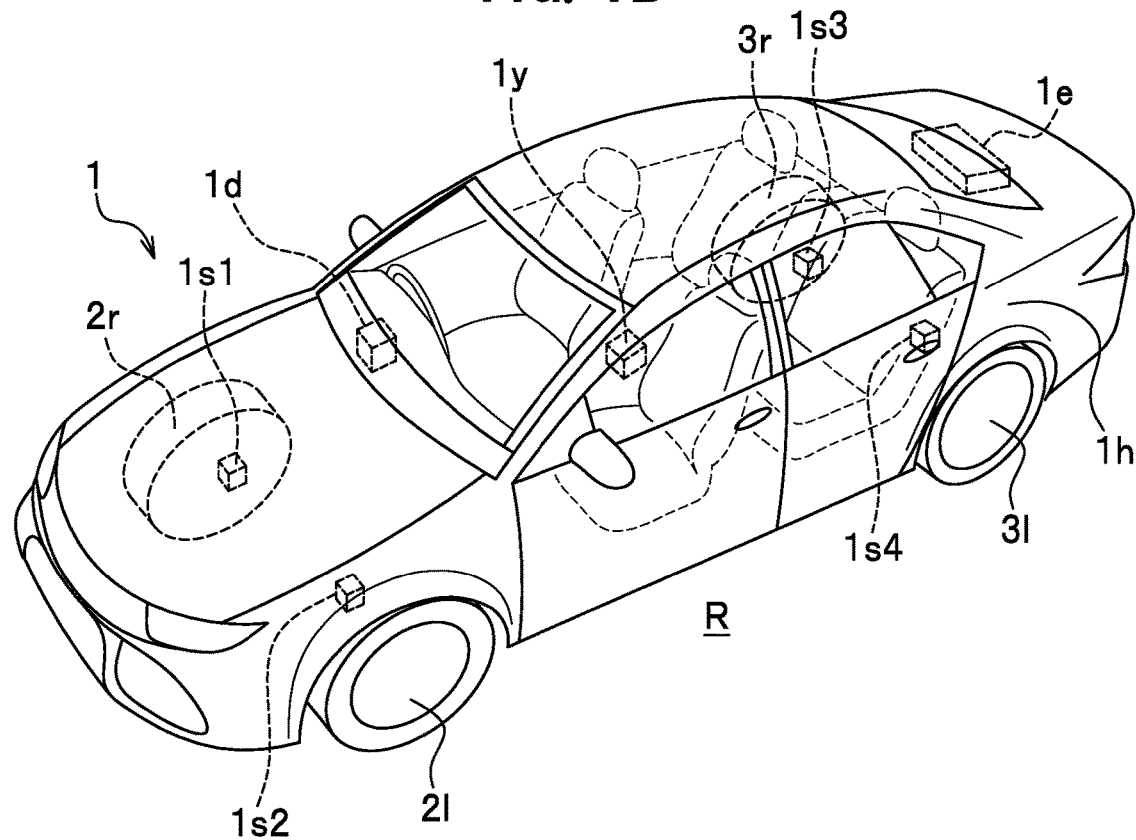
FIG. 1B is a conceptual perspective view of control elements of the vehicle according to the embodiment.

The present invention proposes a mounting position of, and a method of detecting by, a road surface condition detector for a rear wheel configured to detect road surface conditions, in a vehicle such as a four-wheeler. FIG. 1A is a side view of a vehicle 1 according to an embodiment of the present invention. FIG. 1B is a conceptual perspective view of control elements of the vehicle 1 according to the embodiment. The vehicle 1 of the embodiment includes a right front wheel $2r$ and a left front wheel $2l$, as steering wheels to change a moving direction of the vehicle 1, at a front thereof, and a right rear wheel $3r$ and a left rear wheel $3l$, as driven wheels or driving wheels, at a rear thereof.

A vehicle body $1h$ supported by the wheels $2r$, $2l$, $3r$, $3l$ of the vehicle 1 is configured to have one or more passengers therein. The vehicle 1 is provided, on a front thereof, with a headlight $3h$ to irradiate a road surface R to come, and is provided, on a rear thereof, with a rear light $3a$ to irradiate the road surface R to go. The vehicle 1 is also provided, at a front and a rear thereof, with a front bumper $4f$ and a rear bumper $4r$ each configured to absorb impact from a collision at the front or the rear.

The vehicle 1 in FIG. 1B is controlled by a control unit (ECU) $1e$. The control unit $1e$ is configured to include a microcomputer and a circuit. Turning of the vehicle 1 is detected by a yaw rate sensor $1y$. A steering angle of the vehicle body $1h$ is detected by a steering angle sensor $1d$. Wheel speed sensors $1s1$, $1s2$ are provided at rotating portions such as shafts of the right front wheel $2r$ and the left front wheel $2l$, respectively, to detect rotation speeds of the right front wheel $2r$ and the left front wheel $2l$. Wheel speed sensors $1s3$, $1s4$ are provided at rotating portions such as shafts of the right rear wheel $3r$ and the left rear wheel $3l$, respectively, to detect rotation speeds of the right rear wheel $3r$ and the left rear wheel $3l$.

Information detected by the yaw rate sensor $1y$, steering angle sensor $1d$, and wheel speed sensors $1s1$, $1s2$, $1s3$, $1s4$ is inputted to the control unit $1e$. The control unit $1e$ controls the vehicle 1 based on information detected by the yaw rate sensor 1y, steering angle sensor 1d, wheel speed sensors 1s1, 1s2, 1s3, 1s4, and other sensors.

Front preview sensors 5 are provided in front of the right and left front wheels 2r, 2l of the vehicle 1, to detect conditions of the road surface R for the right and left front wheels 2r, 2l, as shown in FIG. 1A. The front preview sensors 5 on the right and left sides each irradiate the road surface R, located below the front preview sensors 5, with laser light, to detect a friction coefficient based on a shape and roughness of the road surface R, and water, snow, ice, or the like on the road surface R, using light reflected from the road surface R.

Rear preview sensors 6 are provided in front of the right and left rear wheels 3r, 3l of the vehicle 1, to detect conditions of the road surface R for the right and left rear wheels 3r, 3l, as shown in FIG. 1A. The rear preview sensors 6 on the right and left sides each irradiate the road surface R, located below the rear preview sensors 6, with laser light (see FIGS. 3B, 4A, 4B), to detect a friction coefficient based on a shape and roughness of the road surface R, and water, snow, ice, or the like on the road surface R, using light reflected from the road surface R. Used as the front preview sensors 5 and rear preview sensors 6, or the road surface condition sensors, are sensors such as radars, cameras, and laser devices, or other sensors. As an example, a description is given of the embodiment with sensors using laser devices, as front and rear preview sensors 5, 6.

The control unit 1e uses road surface conditions detected by the front preview sensors 5 to control electromagnetic dampers at the wheels 2r, 2l, 3r, 3l to keep comfortable riding of passengers. The control unit 1e uses road surface conditions detected by the rear preview sensors 6 to control electromagnetic dampers at the wheels 2r, 2l, 3r, 3l to keep comfortable riding of passengers. The electromagnetic dampers each control respective damping forces of the dampers at the wheels 2r, 2l, 3r, 3l independently. Specifically, amounts of currents flowing through coils inside the electromagnetic dampers are controlled to adjust pressures to open valves for controlling viscous damping forces such as with oil pressures. Here, an electromagnetic damper is described as a damper, as an example, but the damper can be of another kind and is not limited to the electromagnetic damper.

<Front Preview Sensor and Rear Preview Sensor>

As shown in FIG. 1A, the vehicle 1 is provided with the front preview sensors 5 for the front wheels 2r, 2l and the rear preview sensors 6 for the rear wheels 3r, 3l, as the road surface condition detectors 5, 6 to detect road conditions in front of the front and rear wheels 2r, 2l, 3r, 3l.

<Wheel Tracks Followed by Front and Rear Wheels of Vehicle>

Figure 2A:
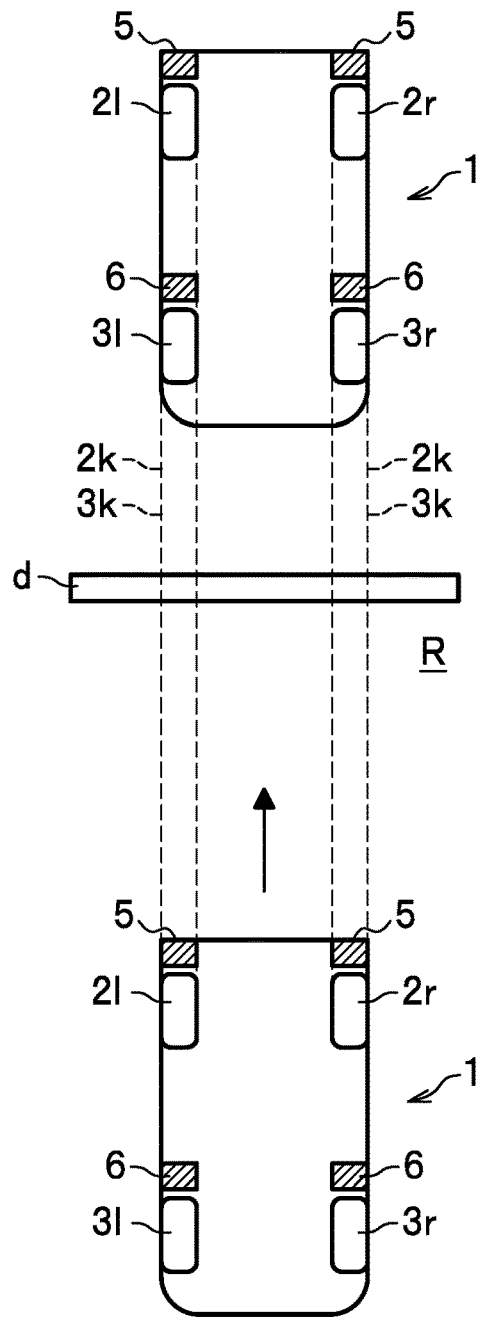
FIG. 2A is a conceptual top view of wheel tracks on a road surface followed by front and rear wheels, while the vehicle is traveling straight.
Figure 2A:
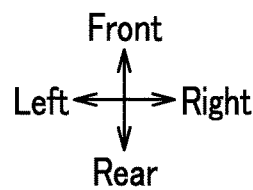

FIG. 2A is a conceptual top view of wheel tracks 2k on the road surface R followed by the front wheels 2r, 2l and wheel tracks 3k on the road surface R followed by the rear wheels 3r, 3l, while the vehicle 1 is traveling straight. FIG. 2A shows the wheel tracks 2k, 3k, while the vehicle 1 is traveling straight over a stepped surface d.

Figure 2B:
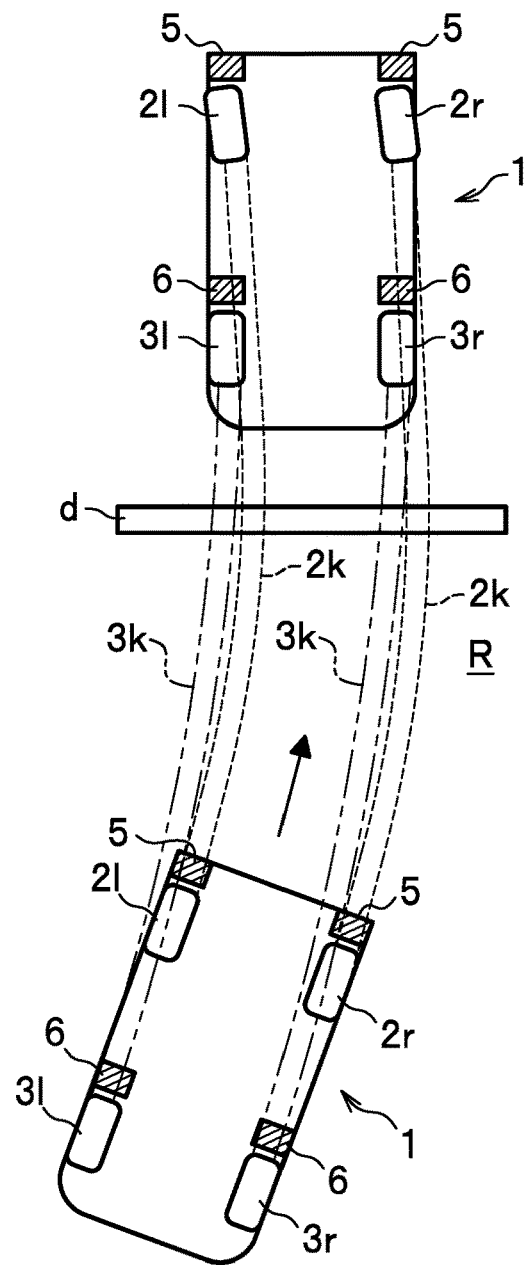
FIG. 2B is a conceptual top view of wheel tracks on the road surface followed by the front and rear wheels, while the vehicle is cornering.
Figure 2B:
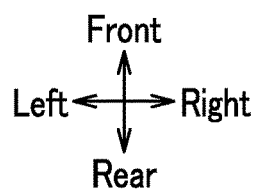

FIG. 2B is a conceptual top view of the wheel tracks 2k on the road surface R followed by the front wheels 2r, 2l and the wheel tracks 3k on the road surface R followed by the rear wheels 3r, 3l, while the vehicle 1 is cornering. FIG. 2B shows the wheel tracks 2k and wheel tracks 3k, while the vehicle 1 is cornering over the stepped surface d. The vehicle 1 has a difference between while the vehicle 1 is traveling straight and while the vehicle 1 is cornering, such that the wheel tracks 2k on the road surface R followed by the right and left front wheels 2r, 2l are the same as the wheel tracks 3k on the road surface R followed by the right and left rear wheels 3r, 3l, while the vehicle 1 is traveling straight, but the wheel tracks 2k are different from the wheel tracks 3k, while the vehicle 1 is cornering.

While the vehicle 1 is traveling straight, as shown in FIG. 2A, the rear wheels 3r, 3l follow the same spots as the front wheels 2r, 2l to have the wheel tracks 3k overlapped with the wheel tracks 2k, and thus only the preview sensors 5 in front of the front wheels 2r, 2l may be needed.

While the vehicle 1 is cornering, as shown in FIG. 2B, the wheel tracks 3k followed by the rear wheels 3r, 3l come out of the wheel tracks 2k which can be detected by the front preview sensors 5. Then, the vehicle 1 uses the rear preview sensors 6 to detect the wheel tracks 3k followed by the rear wheels 3r, 3l. Only areas not covered by the front preview sensor 5, as the road surface condition detector for the front wheels 2r, 2l, are detected by the rear preview sensors 6, as the road surface condition detector for the rear wheels 3r, 3l (see details below).

<Rear Preview Sensor>

Figure 3A:
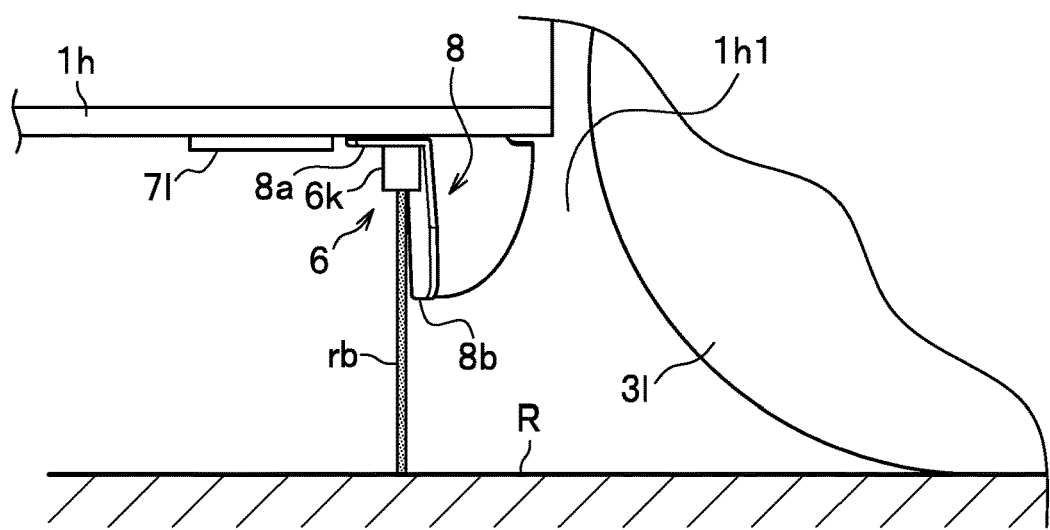
FIG. 3A is an enlarged view of an area indicated by a circle I in FIG. 1A.
Figure 3B:
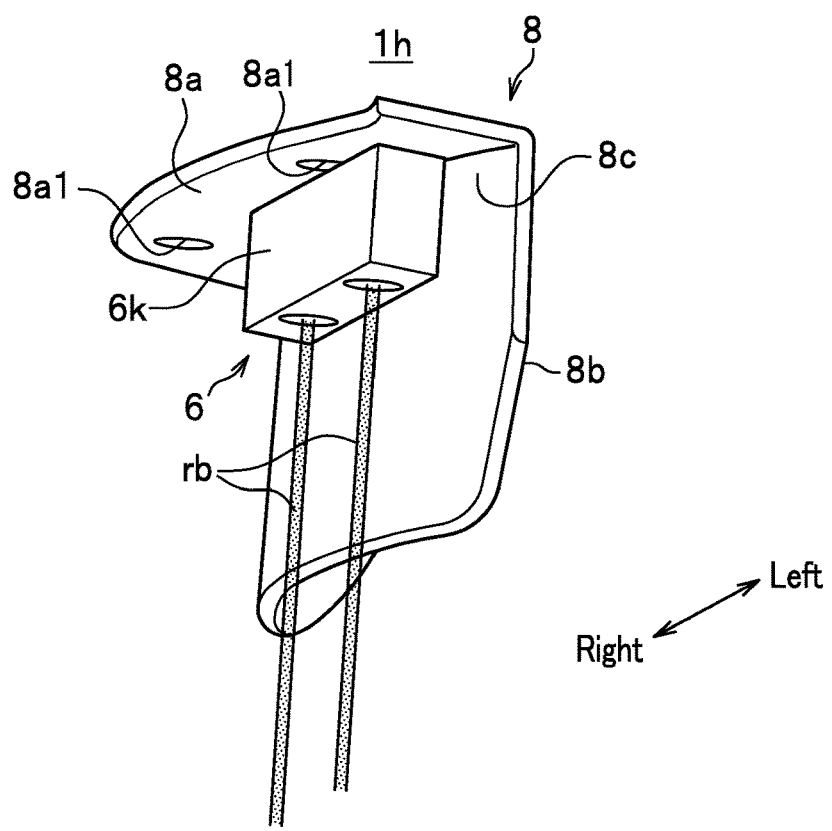
FIG. 3B is a perspective view of a mounted rear preview sensor in FIG. 3A, as viewed from obliquely up ahead.

FIG. 3A is an enlarged view of an area indicated by a circle I in FIG. 1A. FIG. 3B is a perspective view of the mounted rear preview sensor 6 in FIG. 3A, as viewed from obliquely up ahead. When a tire of the vehicle 1 is changed, or at the time of maintenance requiring a person diving under the vehicle 1, a jack is used to jack up the vehicle 1.

As shown in FIG. 3A, the vehicle body 1h has a left jack point 7l, where a jack is placed when the vehicle body 1h is jacked up, fixed thereto, in the middle thereunder and in front of the left rear wheel 3l. Likewise, the vehicle body 1h has a right jack point, where a jack is placed when the vehicle body 1h is jacked up, fixed thereto, in the middle thereunder and in front of the right rear wheel 3r (see FIG. 1A). The left rear preview sensor 6 is provided between the left jack point 7l and the left rear wheel 3l. The left rear preview sensor 6 is provided at a position overlapping with the left rear wheel 3l, when the vehicle 1 is viewed from front.

Likewise, the right rear preview sensor 6 is provided between the right jack point and the right rear wheel 3r. The right rear preview sensor 6 is provided at a position overlapping with the right rear wheel 3r, when the vehicle 1 is viewed from front. Having the right and left rear preview sensors 6 provided at the positions overlapping in the front-rear direction with the rear wheels 3r, 3l reduces detected information from having a skew in the right-left direction. Accordingly, the information detected by the rear preview sensors 6 has less precision error in position with respect to the rear wheels 3r, 3l, to improve detection performance.

The right and left rear preview sensors 6 are symmetrically mounted in the same manner, and a description is given hereinbelow of the left rear preview sensor 6, with a description of the right rear preview sensor 6 omitted. The left rear preview sensor 6 is provided at a position in front of the left rear wheel 3l and not interfering with the left jack point 7l of the vehicle body 1h in terms of a layout. The vehicle body 1h is provided with a rear wheel housing 1h1 (see FIG. 3A) for housing the left rear wheel 3l.

As shown in FIGS. 3A and 3B, a rear strake 8 is provided in front of the left rear wheel 3l, as an aerodynamic automobile part to avoid extra air flow toward the rear wheel housing 1h1. The rear strake 8 reduces air resistance to the left rear wheel 3l. The rear strake 8 is made of resin, for example, and is formed into a substantially L-shaped plate with a mounting portion 8a and a wheel protection wall 8b, as shown in FIG. 3B. The mounting portion 8a of the rear strake 8 is formed with a pair of bolt insertion holes 8a1 for fixing the rear strake 8 to the vehicle body 1h. The bolt insertion hole 8a1 has a fixing bolt inserted and screwed therethrough into the vehicle body 1h.

The wheel protection wall 8b of the rear strake 8 in FIG. 3B is formed into a shape having a mild curvature about a vertical axis so as to surround the left rear wheel 3l from front. The left rear preview sensor 6 is provided between the left jack point 7l, to be used when the vehicle body 1h is jacked up, and the left rear wheel 3l. Specifically, the left rear preview sensor 6 has a sensor housing 6k fixed to a base portion 8c of the rear strake 8 in front of the left rear wheel 3l.

The left rear preview sensor 6 is provided closer to the left rear wheel 3l than the left jack point 7l. Providing the left rear preview sensor 6 closer to the left rear wheel 3l allows for more precisely detecting conditions of the road surface R to be followed by the left rear wheel 3l. In addition, providing the rear preview sensors 6 at the rear strakes 8, as aerodynamic automobile parts to control air flow hitting the rear wheels 3r, 3l while the vehicle 1 is traveling, causes the rear preview sensors 6 to be always blown with air and cooled. This improves efficiency of cooling the rear preview sensors 6.

Further, the rear preview sensors 6 are provided at the positions in front of, and overlapping with, the rear wheels 3r and 3l, when the rear wheels 3r and 3l are viewed from front. This allows for precisely detecting conditions of the road surface followed by the rear wheels 3r and 3l, without any skew in the right-left direction.

The rear preview sensor 6 is configured to irradiate the road surface R therebelow with laser beams rb, as shown in FIG. 3B. The rear preview sensors 6 are mounted for the rear wheels 3r, 3l so as to be integrated with the rear strakes 8 arranged in front of the rear wheels 3r, 3l. This allows the rear preview sensors 6 to be mounted to the vehicle body 1h, without significantly changing appearance of the vehicle 1 as compared with conventional one having no preview sensors for rear wheels.

As for mounting locations in front of the rear wheels 3r, 3l for the rear preview sensors 6, the rear preview sensors 6 are mounted off from the jack points because the jack points are located in front of the right and left rear strakes 8. This allows for managing the vehicle 1 without any changes on serviceability.

<Detection by Rear Preview Sensor>

The wheel tracks 3k followed by the rear wheels 3r, 3l may come out of detection areas 5s (see FIGS. 4A, 4B) detected by the front preview sensors 5 for the front wheels 2r, 2l (i.e., the wheel tracks 2k followed by the front wheels 2r, 2l), as shown in FIG. 2B. FIGS. 4A, 4B are each a partial enlarged view of the vehicle 1, as viewed from an arrowed direction II in FIG. 1.

The control unit 1e in FIG. 1B uses information detected by the yaw rate sensor 1y or the steering angle sensor 1d to obtain information on the vehicle 1 turning. In addition, the control unit 1e obtains information on a speed of the vehicle 1 from the wheel speed sensors 1s1 to 1s4. The control unit 1e uses the information on the vehicle 1 turning and the like to figure out that the vehicle 1 is traveling straight. The control unit 1 uses the information on the vehicle 1 turning and on the speed of the vehicle 1 to figure out that the vehicle 1 is cornering.

Accordingly, the control unit 1e uses the information on the vehicle 1 turning and on the speeds from wheel speed sensors 1s1 to 1s4 to figure out a difference between the wheel tracks 3k followed by the rear wheels 3r, 3l and the wheel tracks 2k followed by the front wheels 2r, 2l, while the vehicle 1 is cornering as shown in FIG. 2B. The relationship between one of the information on the vehicle 1 turning and the speed information, and the difference between the wheel tracks 3k and the wheel tracks 2k, while the vehicle 1 is cornering, may preliminarily be stored in a storage unit of the control unit 1 as mapping data. The control unit 1 uses information from the front preview sensors 5 for the front wheels 2r, 2l, while the vehicle 1 is traveling straight (see FIG. 2A), as a method of detecting by the rear preview sensors 6, to control the vehicle 1.

There is a difference between the wheel tracks followed by the front wheels 2r, 2l and the rear wheels 3r, 3l, while the vehicle 1 is cornering (see FIG. 2B). To cope with this, the rear preview sensors 6 detect areas not detected by the front preview sensors 5 for the front wheels (see detection area 6s1 in FIG. 4A when the vehicle 1 is cornering right, and detection area 6s2 in FIG. 4B when the vehicle 1 is cornering left, which are detected by the rear preview sensors 6), as shown in FIGS. 4A, 4B. The detection areas 6s1, 6s2 detected by the rear preview sensors 6 are set as detection areas located outer in a width direction of the vehicle 1 than ends of the detection areas 5s detected by the front preview sensors 5. The detection areas 6s1, 6s2 detected by the rear preview sensors 6, located outer in the width direction of the vehicle 1 than the ends of the detection areas 5s detected by the front preview sensors 5, can be calculated from the obtained difference between the wheel tracks. Detecting by the rear preview sensors 6 offsets a shortage in detecting by the front preview sensors 5.

The above configuration of having the rear preview sensors 6 mounted in vicinity to the rear wheels 3r, 3l improves detection accuracy when there is a difference between the wheel tracks followed by the front wheels 2r, 2l and the wheel tracks followed by the rear wheels 3r, 3l, such as while the vehicle 1 is cornering. Additionally, areas not detected by the front preview sensors 5 are detected by the rear preview sensors 6.

The rear preview sensors 6 detect only areas not detected by the front preview sensors 5 for the front wheels 2r, 2l, so as to be reduced in size and costs. The rear preview sensors 6 are provided at positions overlapping with the rear wheels 3r, 3l, as viewed from front. This allows the rear preview sensors 6 to detect the detection areas 6s1, 6s2 (see FIGS. 4A, 4B) followed by the rear wheels and not detected by the front preview sensors 5, as in FIG. 2B, while the vehicle 1 is cornering to have a difference between the wheel tracks followed by the front wheels 2r, 2l and the wheel tracks followed by the rear wheels 3r, 3l. This improves accuracy in estimating the spots to be followed by the rear wheels 3r, 3l.

In addition, the rear preview sensors 6 for the rear wheels are mounted between the jack points and the rear wheels 3r, 3l, to effectively use unused portions of the vehicle 1.

MODIFICATIONS

The present invention is not limited to the above-described embodiment, and various modifications are possible within the scope of the appended claims.

LIST OF REFERENCE SIGNS

1: vehicle, 1d: steering angle sensor, 1e: control unit, 1h: vehicle body, 1y: yaw rate sensor, 1s1; 1s2; 1s3; 1s4: wheel speed sensor, 2l: left front wheel, 2r: right front wheel, 3l: left rear wheel, 3r: right rear wheel, 5: front preview sensor (front-wheel road surface condition detector, road surface condition detector), 6: rear preview sensor (rear-wheel road surface condition detector, road surface condition detector), 7*l*: left jack point (jack point), and 8: rear strake (strake, aerodynamic automobile part).

What is claimed is:

1. A vehicle with a road surface condition detector, comprising:
   a vehicle body configured to have one or more passengers;
   front and rear wheels configured to move the vehicle body; and
   a road surface condition detector configured to detect road surface conditions in front of the front and rear wheels,
   wherein the road surface condition detector includes front-wheel road surface condition detectors configured to detect road surface conditions in front of the front wheels and rear-wheel road surface condition detectors configured to detect road surface conditions in front of the rear wheels, and
   the rear-wheel road surface condition detectors detect areas located outer in a vehicle width direction than ends of detection areas detected by the front-wheel road surface condition detectors.

2. The vehicle as claimed in claim 1, wherein
   the rear-wheel road surface condition detectors are each provided at an aerodynamic automobile part for, and located in front of, each of the rear wheels.

3. The vehicle as claimed in claim 1, wherein
   the rear-wheel road surface condition detectors are each provided between a jack point, to be used when the vehicle body is jacked up, and each of the rear wheels.

4. The vehicle as claimed in claim 3, wherein
   the rear-wheel road surface condition detectors are each provided closer to each of the rear wheels than the jack point.

5. The vehicle as claimed in claim 1, wherein
   the rear-wheel road surface condition detectors are each provided at a position in front of, and overlapping with, each of the rear wheels when the rear wheels are each viewed from front.

6. The vehicle as claimed in claim 2, wherein
   the aerodynamic automobile part is a strake.

7. The vehicle as claimed in claim 1, wherein
   the rear-wheel road surface condition detectors detect areas located outer in the vehicle width direction than the detection areas detected by the front-wheel road surface condition detectors.

8. The vehicle as claimed in claim 1, further comprising:
   a yaw rate sensor configured to detect the vehicle body turning;
   a steering angle sensor configured to detect a steering angle of the vehicle body;
   wheel speed sensors configured to detect rotation speeds of the front wheels and the rear wheels; and
   a control unit configured to control the vehicle,
   wherein the control unit uses information detected by one or more of the yaw rate sensor, the steering angle sensor, and the wheel speed sensors to figure out a difference between wheel tracks followed by the front wheels and wheel tracks followed by the rear wheels,
   information detected by the front-wheel road condition detectors is used to detect road surface conditions, while the vehicle is traveling straight, and
   the information detected by the front-wheel road condition detectors and information detected by the rear-wheel road condition detectors are used to detect road surface conditions, while the vehicle is cornering.

\* \* \* \* \*